US005550917A

United States Patent [19]

Tallec

[11] Patent Number: 5,550,917

[45] Date of Patent: Aug. 27, 1996

[54] INTERFACE DEVICE BETWEEN A PUBLIC TELEPHONE AND AN EXTERNAL TERMINAL

[75] Inventor: Ronan Tallec, Issy les Moulineux, France

[73] Assignee: France Telecom Etablissement Autonome De Droit Public, Paris, France

[21] Appl. No.: 546,901

[22] Filed: Oct. 23, 1995

Related U.S. Application Data

[63] Continuation of Ser. No. 208,124, Mar. 9, 1994, abandoned.

[30] Foreign Application Priority Data

Mar. 16, 1993 [FR] France .................................. 93 03007

[51] Int. Cl.[6] .................................................... H04M 1/00

[52] U.S. Cl. .......................... 379/442; 379/399; 379/387

[58] Field of Search .................................. 379/442, 155, 379/151, 399, 412, 387

[56] References Cited

U.S. PATENT DOCUMENTS 5,105,460 4/1992 Williams ................................ 379/155
5,272,747 12/1993 Meads .................................... 379/155

FOREIGN PATENT DOCUMENTS 0160411 11/1985 European Pat. Off. .
0193470 9/1986 European Pat. Off. .
2607343 11/1986 France .

OTHER PUBLICATIONS

Patent Abstracts of Japan–vol. 013, No. 333, Jul. 26, 1989–JP 10097047–Apr. 14, 1989.

Patent Abstracts of Japan–vol. 010, No. 061, Mar. 11, 1986–JP 60212059–Oct. 24, 1985.

French Search Report–FA 483407–FR 9303007–Nov. 29, 1993.

*Primary Examiner*—Jeffery Hofsass
*Assistant Examiner*—Jack Chiang
*Attorney, Agent, or Firm*—Pearne, Gordon, McCoy & Granger

[57] ABSTRACT

An interface device between a public telephone (9) and an external terminal (14), the public telephone (9) having a control circuit (10) connected to a telephone line (20) and the interface device having a connector (15) accessible to the user. A switching circuit (22) makes it possible to switch the line (20) either to the control circuit of the public telephone (10), or to a connector control circuit. An information circuit of a connection of the external terminal is in the connector, a first electrical insulation module (21) is located between a connector control circuit and the switching circuit (22), a second electrical insulation module (19) is between a connector control circuit and the control circuit of the public telephone (9) and a control circuit of the connector (16).

12 Claims, 5 Drawing Sheets

INTERFACE DEVICE BETWEEN A PUBLIC TELEPHONE AND AN EXTERNAL TERMINAL

This is a continuation of application Ser. No. 08/208,124, filed Mar. 9, 1994, now abandoned.

BACKGROUND OF THE INVENTION

1. Field of the Invention

The present invention relates to an interface device between a public telephone and an external terminal.

2. Description of Related Art

Portable telecommunications terminals, such as microcomputers with a communication card, are becoming evermore widely used. Their owners wish to be able to use them everywhere and, in particular, in public telephones or Publiphones (registered trademark), which are telephones using prepayment or postpayment available to the public.

In order to permit such a use, the public telephones must be equipped with an external connector. In the past, few options have been offered to users as a result of the fraud risks involved with such a connector. There has been no significant development up to now with regards to connectors for connecting external terminals, essentially for security reasons.

Reference can be made to the following solutions:

dedicated interface between a public phone and a terminal with mechanical protection of the different accesses to the phone line, connection of external terminals to card phones, in which the security of the telephone line is brought about by the network paying in real time the charge units emitted by the connection switch, connector for external terminals to public telephones installed in protected places, where the security of the connector is very limited.

In the case of a dedicated interface between a public phone of a particular type and a terminal of a particular type, the security of the phone line is brought about "mechanically" by physical protection of all accesses to the phone line. This type of product is installed in direct view of the public telephone user. Moreover, this type of interface only functions with a public phone of a particular type and a terminal of a particular type. Reference can be made in exemplified manner to the device known as a "Point Phone" (registered trademark) and its interface for the "Minitel" (registered trademark), which makes it possible to obtain a "Publivideotex" (registered trademark). It is, for example, not possible to connect to such a product a portable microcomputer equipped with a modem. Another example relates to the Point Phone and a fax, which makes it possible to obtain a "Publifax" (registered trademark). In both cases, the interface between the Point Phone and the Minitel or fax is specific to each unit.

In the case of a connector of external terminals to card phones, the security of the phone line is brought about by real time payment of the charge units emitted by the connection switch. Between the card phone and the switch is inserted a device in cutoff. For each charge pulse emitted by the switch, the device interrogates the card phone to establish whether the charge has been received and debited from the card. In the case of an incorrect response, the device interrupts the communication. The dialogue between the card phone and the device takes place by an above voice link outside the telephony band. The security for the connector for the external terminal then takes place by an above voice dialogue. In this case the security is not supplied by the card phone, but by the network to which is connected this public telephone type.

In the case where the connector of external terminals is correctly fitted to the public telephone, security is limited. Therefore, the installation of this type of public telephone takes place in protected places, where the risks are minimized. Outside France, reference can be made to the making available to the user of a connector for an external terminal the public telephone developed by ATT and which is mainly installed at airports in the USA.

In order to significantly develop the possibility of connecting an external terminal to a public phone, it is necessary for the connector not to constitute a risk of non-payment for communications. Until now, only two possibilities, described hereinbefore, make it possible to bring about a general connection of external terminals to a connector.

In the case of a connector to card phones, it is necessary to have, in the connection switch areas, a device in order to follow in real time the payment for the communication. Even though this device offers all the necessary security, the connection of the card phone cannot take place at any random location, in the absence of the above voice device, and the card phone does not meet all the requirements made.

In the case where the connector of external terminals is connected directly to the public telephone, there is a high fraud risk. Therefore such a public telephone can only be installed when the monitoring thereof is permanently ensured by the operator.

In order to solve these different problems, an aim of the present invention is to offer users a connector for external terminals to public telephones ensuring a good immunity to attempts at fraud without requiring the aforementioned above voice device. The securities provided by the public telephone and not by the network.

SUMMARY OF THE INVENTION

To this end, the invention proposes an interface device between a public telephone and an external terminal, the public telephone having a control circuit connected to a telephone line, the interface device incorporating a connector accessible to the user, a switching circuit making it possible to switch the line either to the control circuit of the public telephone, or to a control circuit of the connector, an information circuit on a connection of the external terminal in the connector, a first electrical insulation module, a second electrical insulation module, wherein it also comprises a control circuit for the connector, the first electrical insulation module being positioned between the control circuit of the connector and the switching circuit and the second electrical insulation module is placed between the connector control circuit and the public telephone control circuit.

Advantageously, the device according to the invention comprises a power supply circuit for the external terminal, which can either be within the public phone and connected to the connector control circuit via a third electrical insulation module, or external thereof and placed between the external terminal and the connector.

The information circuit of a connection can be a current detector circuit, or an external switch manipulatable by the user.

In a particularly advantageous embodiment, the electrical insulation modules have in each case a transformer. An a.c. power supply is connected to a current regulating circuit across a transformer and a diode bridge, the output of the regulator being inserted between two windings of the transformer constituting the first electrical insulation module. The current regulating circuit comprises a transistor, two resistors and a diode, a first capacitor making it possible to loop the alternating current and a second capacitor making it possible to smooth the direct current.

Advantageously, the current detector is constituted by an optical coupler, a capacitor permitting the passage of alternating currents.

In a variant, the device according to the invention comprises an amplifying unit constituted by a two wire-four wire passage module, two amplifiers for two wires respectively in one transmission direction and in the other, and a four wire-two wire passage module.

In a digital variant, the control circuit of the public phone comprises an encoding-decoding circuit and a line interface circuit connected to the phone line, a two wire-four wire module being placed between the first electrical insulation module and the switching circuit, which makes it possible to switch the public phone control circuit connected to the line either to the connector, or to the hand set.

Advantageously, the invention makes it possible to obtain a connection device between an external terminal, which can, for example, be a portable microcomputer, a portable fax, a portable Minitel, a portable telephone set and a public telephone ensuring a good immunity to fraud attempts without using an above voice device, which requires a dialogue connection, in a frequency outside the telephony band, between the external terminal and the public telephone. In the device according to the invention security is provided by the public telephone and not by the network.

In order to eliminate any possibility of fraudulent use of the connector, the invention makes it possible to ensure the following functions:

- immunity to masking charge pulses by disturbances which could be generated by an ill-intentioned user (in the case where charging takes place by pulses emitted by the switch),
- checking the phone line connector by the public telephone and not by the external terminal, this function being necessary in all charge calculation modes,
- checking the dialling by the public phone in the case where there are restrictions with respect to calling certain numbers.

The solution offered is particularly interesting in the case where the communication charge is calculated and then emitted by the connection switch. In France, the charge pulses are emitted from said switch to the public phone in the form of 12 kHz frequencies for about 100 milliseconds. In other countries, the frequency can be 16 kHz. In the case where the calculation of the charge takes place locally by the public phone, the invention still remains usable and also improves the immunity to fraud.

BRIEF DESCRIPTION OF THE DRAWINGS

These an further features of the present invention will be apparent with reference to the following description and drawings, wherein.

DETAILED DESCRIPTION OF THE PREFERRED EMBODIMENTS

Figure 1:
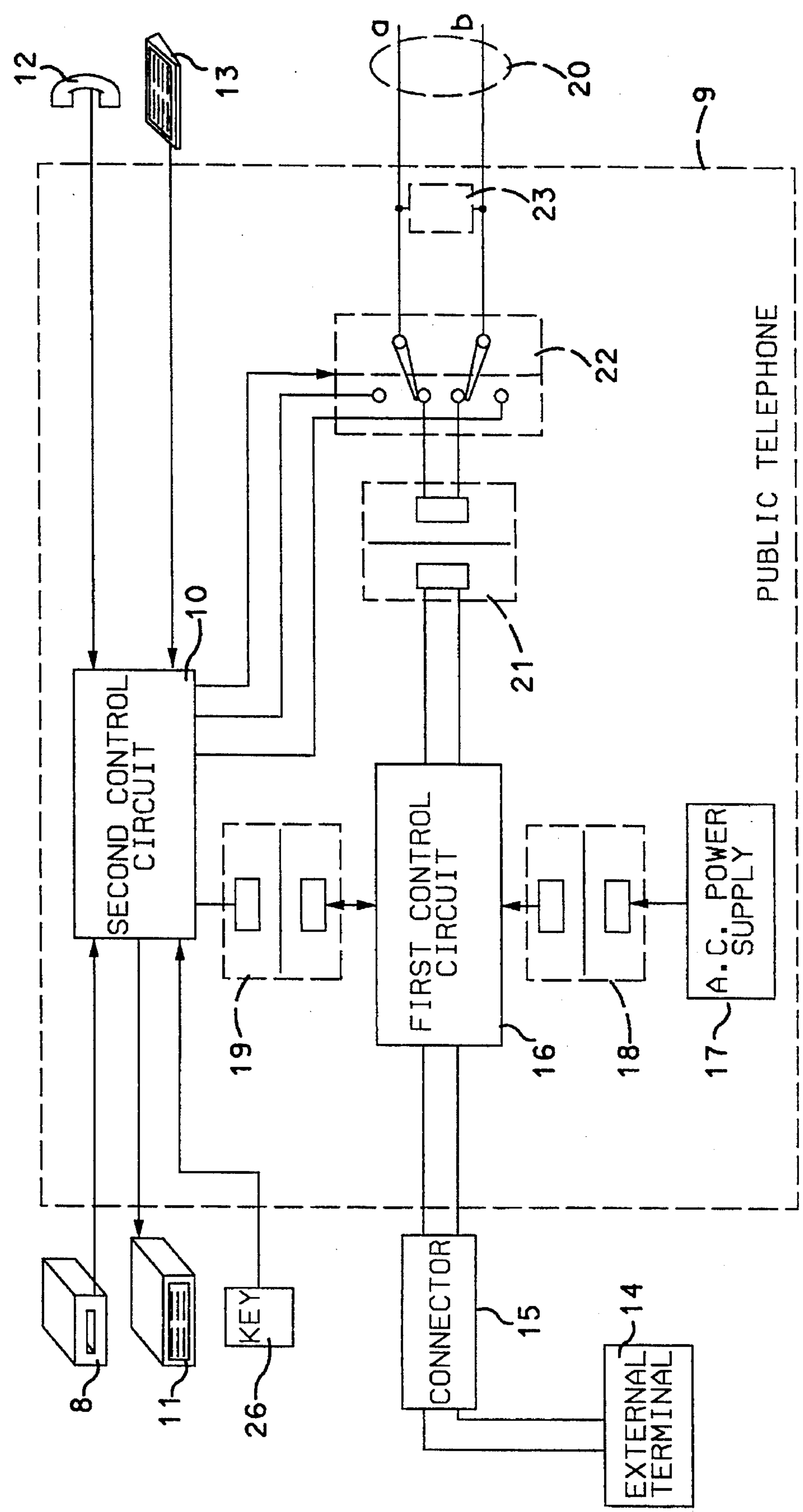
FIG. 1 illustrates the device according to the invention.

As shown in FIG. 1, the device according to the invention forms an interface between, on the one hand, the circuits constituting a public telephone 9, which are in particular a control circuit 10, to which can be connected a smart card reader 8, a display 11, a telephone hand set 12 and a keypad 13, and, on the other hand, an external terminal 14. The device includes a user-accessible connector 15 and a control circuit 16 for said connector. The control circuit 16 is connected to two wires (a and b) of a telephone line 20 via a first electrical insulation module 21 and a switching circuit 22. The module 21 and switching circuit 22 make it possible, when the public phone control circuit 10 detects a connection of an external terminal 14 in the connector 15, to switch the line 20 which was connected to the control circuit 10 of the public phone 9 to the connector 15, to the control circuit 10 of the public phone 9 across a second electrical insulation module 19 or to a power supply circuit 17 of the external terminal 14 across a third electrical insulation module 18.

A possible charge receiver 23 can be integrated into the public phone between the two wires a and b of the phone line 20.

The device according to the invention makes it possible to produce the connection between the external terminal 14 and the circuits forming the public phone 9, with the installation of a connector 15 for said external terminal 14.

Figure 2:
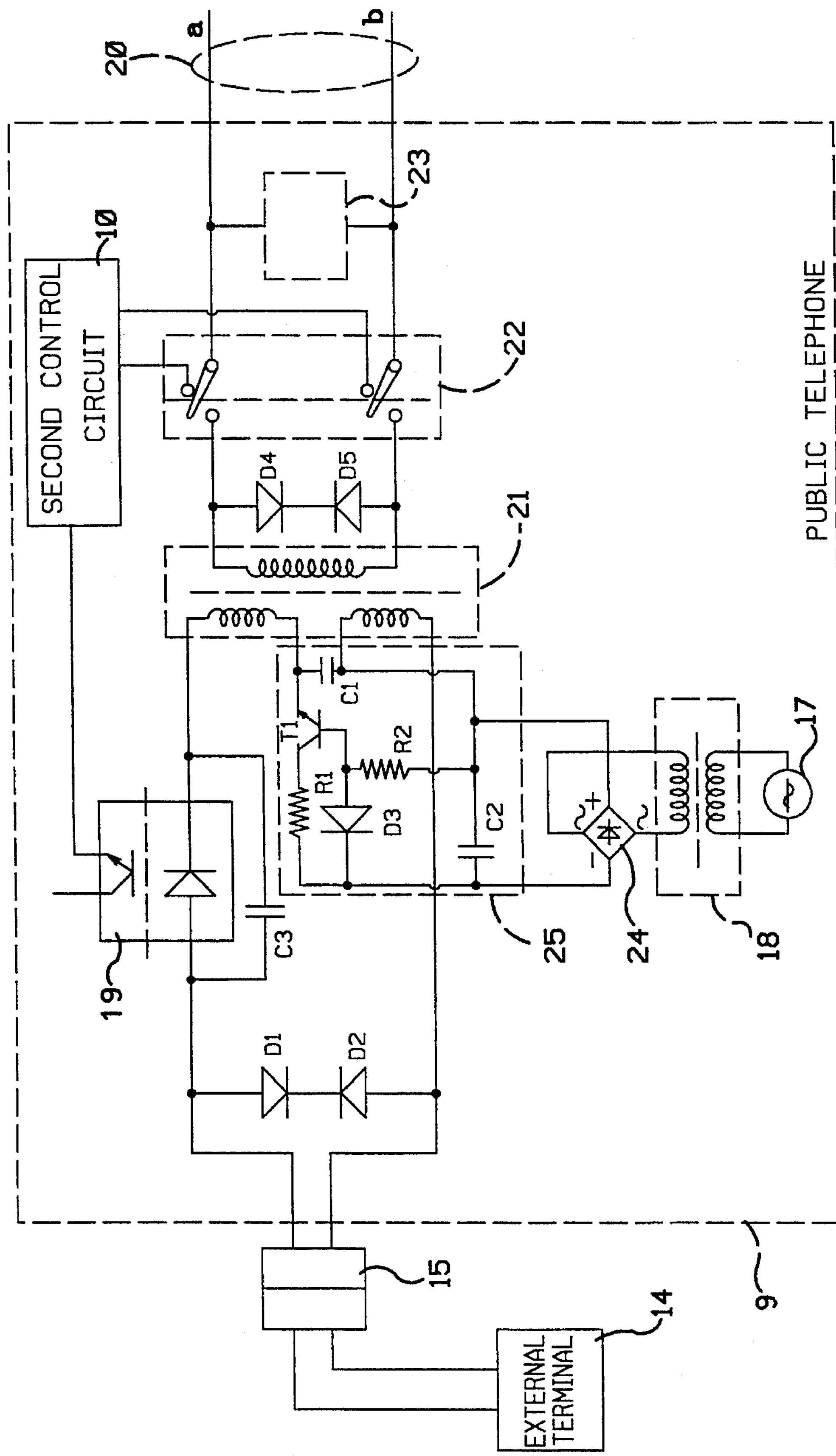
FIG. 2 illustrates an embodiment of the device according to the invention.

FIG. 2 illustrates an embodiment of the device according to the present invention wherein the circuits, circuits which are identical to those of FIG. 1, retain the same reference numerals.

The power supply circuit 17 is an a.c. power supply connected across the third electrical insulation module 18, here constituted by a transformer, to a rectifier diode bridge 24, whose two branches are connected to a current regulating circuit 25 formed by a transistor T1, two resistors R1, R2 and a diode D3, a first capacitor C1 permitting the passage of the a.c. signals and a second capacitor C2 making it possible to smooth the direct current.

The first electrical insulation module 21 comprises a double insulation transformer for balancing the line by injecting current in the center. The second electrical insulation module 19 is formed by an optical coupler, the third capacitor C3 making it possible to avoid an attenuation of the alternating current.

Two diodes D1 and D2, arranged head to tail, make it possible to limit the very high level signals which it is wished to introduce to the connector 15. The diodes D4 and D5 protect the line 20. The connection of an external terminal 14 to the connector 15 is detected by monitoring the appearance of a direct current.

In the embodiment shown in FIG. 2, the device according to the invention is consequently integrated into a public phone having an external power supply. The three basic components in this embodiment are once again the electrical insulation, the local power supply and the current detector.

The galvanic insulation is provided by a transformer, whose passband is equivalent to that of the telephony band, i.e. 300 to 3400 Hz.

The local power supply is constituted by a direct current supply. The ballast-connected transistor T1 limits the direct current in the case of a short-circuit of the two jacks of the connector 15 for the external terminals. This supply is generated from an alternating current source 17 across the transformer 18 exclusively reserved for this purpose in order to preserve the electrical insulation. The supply is inserted between two windings of the transformer 21 in order to ensure a good symmetry. The capacitor C1 permits the passage of a.c. signals. In this case, it is considered that the public telephone has an external power supply, in addition to its remote power supply by the line. This case corresponds to a large number of installation possibilities and is coherent with the type of public phones which will have the connector 15.

The second electrical insulation module 19, which serves as a current detector, is constituted by an optical coupler, which informs the public telephone of the looping of the connector 15 by a terminal 14. The capacitor C3 permits the passage of a.c. signals and the electrical insulation is preserved.

The proposed diagram prevents any direct loop break action on the telephone line. However, it permits the transmission of all signals in the band 300 to 3400 Hz, when the telephone line is oriented towards the connector of the external terminals.

In order to limit the level of the a.c. signals to be emitted on the telephone line, the two head to tail diodes D4 and D5 limit any a.c. signal above a certain level.

In the same way, to limit interference on the line, the transformer filters frequencies outside the telephony band. If necessary, a passive filter can be introduced at the connector input.

In order to render secure said link and ensure the previously described functions, the invention must have the following characteristics:

- an electrical insulation ensures the separation between the external terminal and the public phone,
- a local power supply simulates a connection to a switch for the external terminal, said supply being necessary to permit the operation of any external terminal,
- a current detector makes it possible to monitor the connection to the connector 15 of a terminal 14 in the communication mode, said function not being indispensable, but offers the user a simpler operating mode.

The charge receiver of the public phone 23, when present, is always at the input of the public phone 9 in order to monitor, in all phases and at all times, the arrival of charge units.

The electrical insulation ensures an electrical separation between the two contacts of the connector 15 and the electronics of the public phone. This insulation must authorize a passband equivalent to that of the telephony band, i.e. 300 to 3400 Hz. Thus, the electrical insulation fulfils two functions, namely an immunity function with respect to certain fraud attempts and a function of preventing connection of the telephone line 20 by the terminal 14, which must only take place through the public phone.

The local power supply for the external terminal 14 is based on a power supply, which must be electrically insulated both from the telephone line 20 and the general public phone supply. This supply is within the voltage and current values simulating a connection to the telephone line. There is a current limiting device in order to eliminate any risks of deterioration of the external terminal or of danger for the user.

A current detector makes it possible to monitor the connection of an external terminal to the connector. This detector must also be electrically insulated from the electronics of the public phone. The function of this detector is to recognize the presence of a direct current in the connector, i.e. is informed that the external terminal is looped. It can also be used for detecting attempts at decimal dialling which could be emitted by the connected terminal. The connector for the external terminal has two connection jacks, the connector being sufficiently robust to withstand various attacks.

In order to ensure the necessary security level of the public telephone system equipped with a connector for external terminals, the device according to the invention must be integrated into the public phone. It must form the link between the external terminal and the components of the public phone. The operation of this device is described hereinafter in different phases of a telephone communication from a public phone.

On call pick-up, which results from the hand set 12 being removed by the user, there is no change to the operation of the public phone in the phone mode. When there is a connection for an external terminal 14, the switching to the external terminal can take place in two different ways:

- by pressing a specific key 26 on the public phone,
- by automatic connection, when the public phone is able to detect the presence of an external terminal 14.

These two solutions can either both be present on the same public phone, or can be exclusive depending on the functions which it is wished to offer to the user.

On connecting an external terminal, the public phone is informed of the connection request either by a presence detector on the connector 15, or by pressing the connection key 26. This request is only taken into account if a valid payment means is present in the public phone. If the payment means is valid, the real call pick-up takes place by the public phone.

The telephone line 20 is immediately switched to the external terminal 14 across an electrical insulation 21, if dialling is to take place by the external terminal. If not, switching only takes place after dialling.

The following phase is the dialling phase. Dialling can be emitted either by the public phone, or by the external terminal. These two possibilities may or may not be simultaneously offered on the public phone. More particularly, dialling by the external terminal 14 can be prevented for security reasons.

Thus, dialling can be performed by the public phone. This is the simplest case and is the most appropriate when there are use restrictions with respect to certain numbers. A priori it ensures the best security. The dialling of the authorized numbers only is then ensured, because the public phone controls everything. No frequency can be emitted on the phone line by the terminal 14 before the end of dialling, because the connection to the connector is broken. At the end of dialling, the connection to the connector 15 is established and the external terminal can be placed in the conversation phase.

Dialling can also be performed by the external terminal 14. This case is more difficult to control. If there are no use restrictions with respect to certain numbers, dialling at voice frequencies can be directly transmitted to the telephone network via the interface. If it must also be possible to use decimal dialling, a current detector recognizes decimal dialling and the public phone redials on the telephone line in order to transmit the number, because there is electrical insulation between the external terminal and said line. This redialling can either be decimal, or in voice frequency. If there are use restrictions with respect to certain numbers, dialling monitoring is indispensable. In decimal dialling, this can take place with the aid of the current detector. In voice frequency dialling, monitoring must take place with the aid of a voice frequency detection circuit integrated into said interface, whilst still maintaining an electrical insulation. If a forbidden number is detected, the communication is interrupted. If the number is authorized, dialling is emitted as previously.

In the conversation phase, the user can use his external terminal 14 and transmit all frequencies in the telephony band. The telephone line 20 is oriented to the external terminal 14 across the electrical insulation 21. The local power supply simulates a real phone line for the external terminal. The current detector ensures that the external terminal is present. The immunity to fraud is ensured by the electrical insulation, which prevents any interference with the telephone line.

The end of communication can be brought about:

on the instruction of the public phone, e.g. if credit is exhausted, by breaking the communication on the part of the external terminal in the following cases:

when the user disconnects the terminal from the external connector, when the external terminal breaks the continuous loop on the connector (equivalent to clearing the line), the current detector informing the public telephone thereof and at this time it releases the real phone line.

In certain cases, the public phone offers a "credit restart" possibility, either by performing a brief line clearing, or by pressing on a specific key. This facility can be retained with the external connector. In this case, after recognizing a "credit restart" request on the part of the user, the public phone opens the line in order to release the equipments from the switch and then reloops the line. A normal communication cycle can then resume.

A number of variants of the device according to the invention will now be considered.

Figure 3:
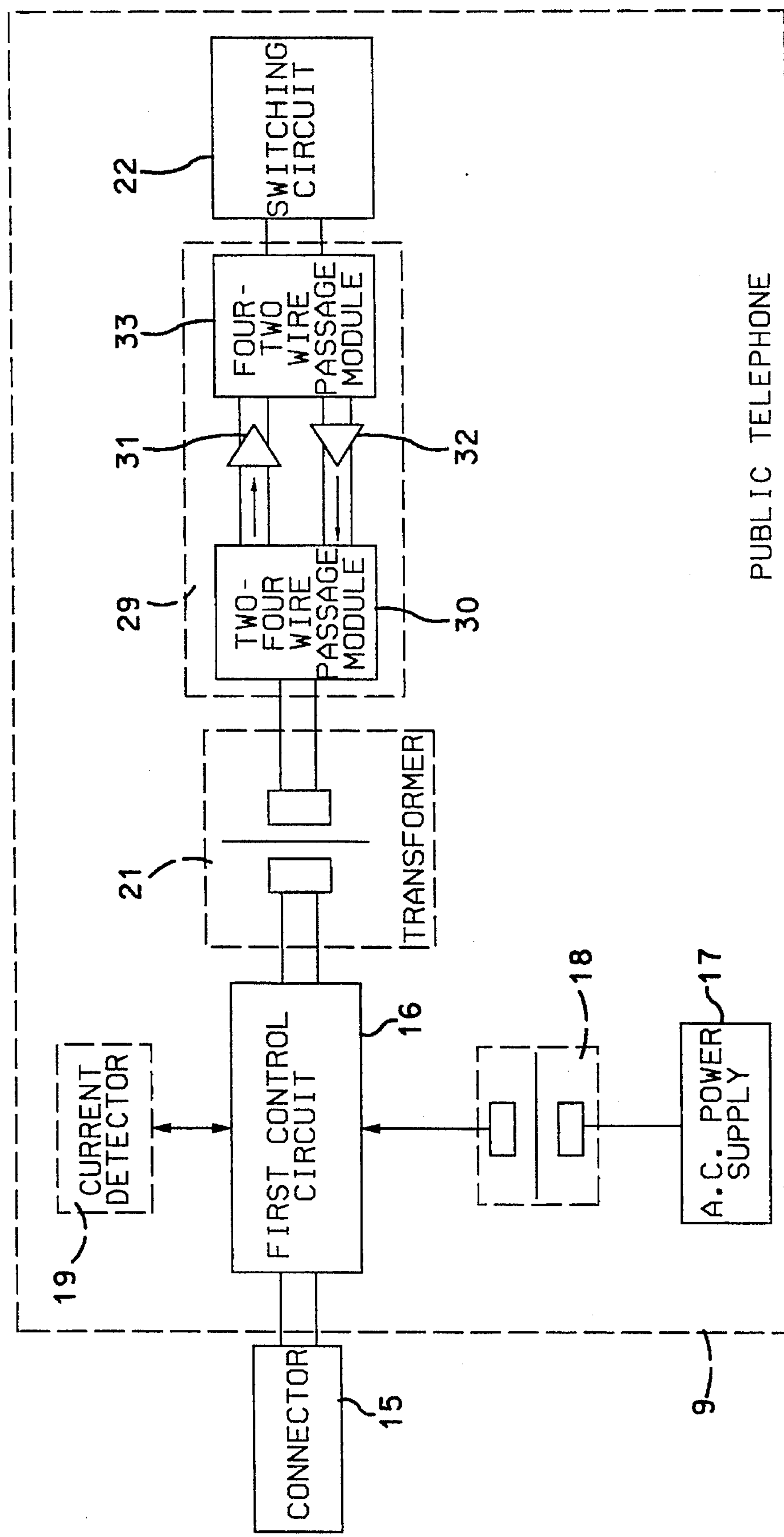
FIGS. 3 to 5 illustrate three variants of the device according to the invention.

When the attenuation is excessive between the connector 15 and the phone line 20, an amplification of the telephone signals is introduced. This amplification takes place on the public phone side for eliminating electrical insulation problems. A two wire-four wire passage module is provided for amplifying the signal in each direction. For the connection with the telephone network, this can take place on a public phone speech circuit. Thus, in a first embodiment shown in FIG. 3, an amplification unit is inserted between the transformer 21 and the switching circuit 22. It comprises a two wire-four wire passage module 30, two amplifiers 30, 31 for two wires, respectively in the two transmission directions, and a four wire-two wire passage module 33.

Figure 4:
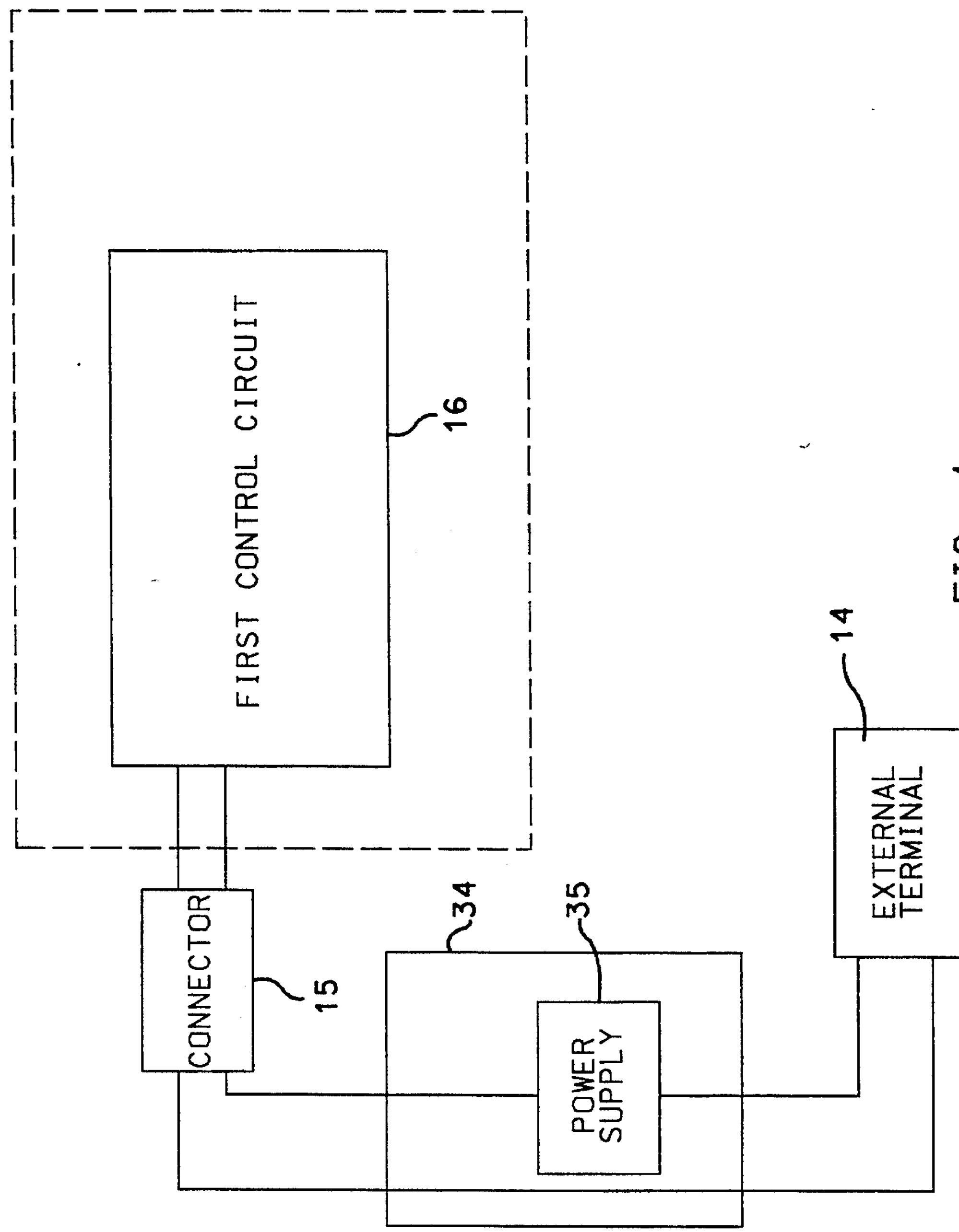

In the case where there is no external power supply for the public phone, it becomes difficult to make a local supply to said public phone for energy balance reasons in connection therewith. Under these conditions, the solution consists of the user having a specific cord between the public phone connector and the external terminal. This specific cord generates a power supply from batteries or accumulators. This power supply replaces the local power supply described in the basic system, there being no other changes. Electrical insulation is ensured because the supply comes from an independent external source. Thus, in a second variant shown in FIG. 4, the user must interpose a specific box 34 having a power supply 35 between his terminal 14 and the connector 15.

The operating modes described hereinbefore relate to analog public phones, where it is essential to secure access to the phone line.

Figure 5:
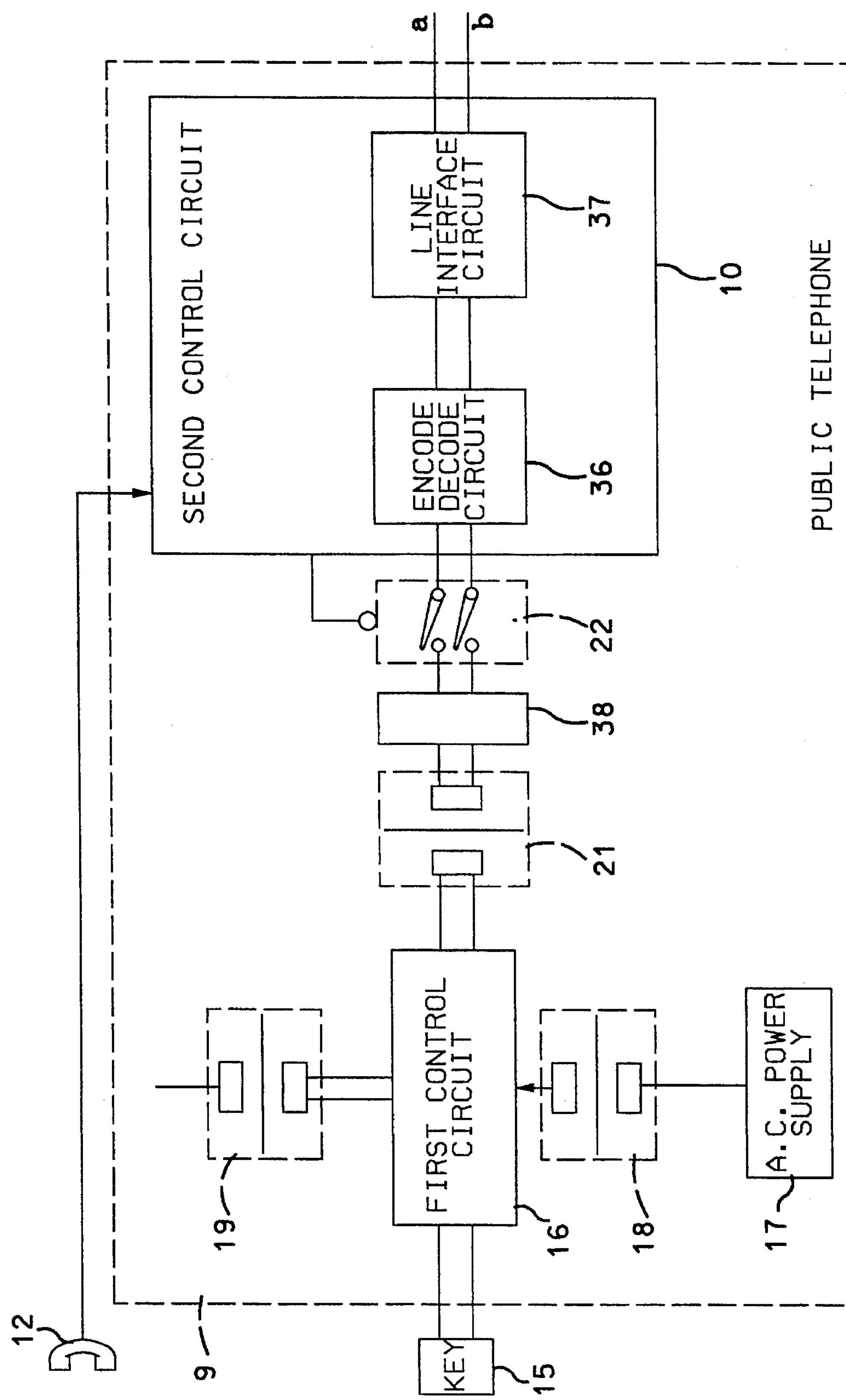

In the case of a digital public phone, a connector for analog external terminals is brought about in the same way. In this case, the part of the device according to the invention on the connector side does not change. The part of the device on the public phone side undergoes development. At the output of the transformer 21, a phone signal digitizing circuit permits the digital emission on the line 20 across the public phone interface. This circuit also transforms the signals received from the line via the public phone into analog signals transmitted to the connector via the transformer. A third digital variant is shown in FIG. 5. The public phone control circuit 10 then comprises an encoding-decoding circuit 36 and a line interface circuit 37. A two wire-four wire module 38 is placed between the first electrical insulation module 21 and the switching circuit 22, which makes it possible to switch the public phone control circuit 10 connected to the telephone line either to the connector 15, or to the hand set 12. The operating principles of the device according to the invention on the connector side remain the same. Dialling from the external terminal can be envisaged in the same way as in the case of the analog public phone with digital redialling by the latter.

I claim:

1. Interface device between a public telephone and an external terminal, said interface device incorporating a connector accessible to one user, a first control circuit for the connector, a second control circuit of the public telephone connected to a telephone line, a switching circuit switching the line either to the second control circuit of the public telephone, or to the first control circuit of the connector, a first electrical insulation module being positioned between the first control circuit of the connector and the switching circuit and a second electrical insulation module being placed between said first control circuit and the second control circuit, said second electrical insulation module also detecting connection of the external terminal to the connector.

2. Device according to claim 1, further comprising a power supply circuit for the external terminal.

3. Device according to claim 2, wherein the power supply circuit is within the public telephone and is connected to the first control circuit of the connector across a third electrical insulation module.

4. Device according to claim 2, wherein the power supply circuit is an external box placed between the external terminal and the connector.

5. Device according to claim 1, wherein the second insulation module is a current detector circuit.

6. Device according to claim 1, wherein the second insulation module is an external switch which is manipulated by the user.

7. Device according to claim 1, wherein the electrical insulation modules in each case comprise a transformer.

8. Device according to claim 7, further comprising an a.c. power supply connected to a current regulating circuit across one of the transformer and a diode bridge, said regulator having its output inserted between two windings of said one of the transformer constituting the first electrical insulation module.

9. Device according to claim 8, wherein the current regulating circuit comprises a transistor, two resistors and a diode, a first capacitor to loop the alternating current and a second capacitor to smooth the direct current.

10. Device according to claim 7, wherein the current detector is constituted by an optical coupler, a capacitor permitting the passage of alternating currents.

11. Device according to claim 1, further comprising an amplifying unit, the amplifying unit comprising a two wire-four wire passage module, two amplifiers and a four wire-two wire passage module, one of the amplifiers is in a first transmission direction, and the other amplifier is in a second transmission direction opposite from the first transmission direction.

12. Device according to claim 1, wherein the public telephone control circuit comprises an encoding-decoding circuit and a line interface circuit connected to the telephone line, a two wire-four wire module being inserted between the first electrical insulation module and the switching circuit to switch the public phone control circuit connected to the line either to the connector, or to the hand set.

* * * * *